United States Patent
Oswald et al.

(10) Patent No.: US 6,849,114 B2
(45) Date of Patent: Feb. 1, 2005

(54) DISPERSION COMPRISING SILICON/ TITANIUM MIXED OXIDE POWDER, AND GREEN BODIES AND SHAPED GLASS ARTICLES PRODUCED THEREFROM

(75) Inventors: Monika Oswald, Hanau (DE); Klaus Deller, Hainburg (DE); Helmut Mangold, Rodenbach (DE); Gerrit Schneider, Hanau (DE); Rolf Clasen, Saarbruecken (DE); Markus Hornfeck, Blieskastel (DE)

(73) Assignee: Degussa AG, Duesseldorf (DE)

( * ) Notice: Subject to any disclaimer, the term of this patent is extended or adjusted under 35 U.S.C. 154(b) by 50 days.

(21) Appl. No.: 10/372,411

(22) Filed: Feb. 25, 2003

(65) Prior Publication Data

US 2003/0232149 A1 Dec. 18, 2003

(30) Foreign Application Priority Data

Feb. 27, 2002 (DE) .......................... 102 08 371

(51) Int. Cl.$^7$ ............................ C03C 3/06; C03C 3/076; C03B 8/04; C03B 19/06; C03B 29/00
(52) U.S. Cl. .................. 106/286.4; 501/27; 501/53; 501/54; 501/55; 501/133; 501/134; 501/900; 359/642; 359/726; 359/838; 264/1.1; 264/1.21; 264/2.6; 264/2.7; 65/37
(58) Field of Search ................ 106/286.4; 501/27, 501/53, 54, 55, 133, 134, 900; 359/642, 726, 838; 264/1.1, 1.21, 2.6, 2.7; 65/37

(56) References Cited

U.S. PATENT DOCUMENTS 3,960,855 A * 6/1976 De Marinis et al. ........ 540/226

FOREIGN PATENT DOCUMENTS

| EP | 0 595 078 | 5/1994 |
| EP | 0 850 876 | 7/1998 |
| EP | 1 284 277 | 2/2003 |

OTHER PUBLICATIONS

Borosilicate glasses, pp. 104–105, "Special Glasses and Their Applications" (with English translation), May 2000.

* cited by examiner

*Primary Examiner*—David Brunsman
(74) *Attorney, Agent, or Firm*—Oblon, Spivak, McClelland, Maier & Neustadt, P.C.

(57) ABSTRACT

Aqueous dispersion comprising silicon/titanium mixed oxide powder with a BET surface area of 5 to 500 $m^2$/g which has been prepared by flame hydrolysis and has a titanium dioxide content of 0.5 to 20 wt. %, based on the powder, water and at least one pH-regulating substance which can be removed completely from the reaction mixture on heating, the aqueous dispersion having a solids content of between 40 and 80 wt. %. A green body produced therefrom with a green density of between 40 and 85%. A shaped glass article of optical quality with a coefficient of thermal expansion of not more than $0.5 \times 10^{-6}$/K produced from the green body.

21 Claims, No Drawings

DISPERSION COMPRISING SILICON/TITANIUM MIXED OXIDE POWDER, AND GREEN BODIES AND SHAPED GLASS ARTICLES PRODUCED THEREFROM

FIELD OF THE INVENTION

The invention relates to an aqueous dispersion which comprises pyrogenically prepared $SiO_2/TiO_2$ mixed oxide powder, and to green bodies and shaped glass articles of low coefficient of thermal expansion produced therefrom.

BACKGROUND OF THE INVENTION

Known systems which form $SiO_2/TiO_2$ glass are distinguished by their good thermal properties, their high refractive index and their low coefficient of thermal expansion. The low coefficient of expansion is of importance for the production of optical components in which dimensional accuracy must be guaranteed over a wide temperature range.

A known process for the production of binary $SiO_2/TiO_2$ glasses is by melting. Disadvantages are on the one hand that the melting temperature of 1,700° C. is very high, and on the other hand phase separation and devitrification very readily occur during cooling of the glass melt.

Another known method which is most frequently employed for the production of $SiO_2/TiO_2$ glasses is the sol-gel process. In many cases this comprises hydrolysis and condensation of organometallic compounds.

U.S. Pat. No. 4,278,632 describes the production of $SiO_2/TiO_2$ glasses by reaction of alkoxides of silicon and titanium or the partly hydrolysed alkoxides in the presence of water. After the hydrolysis the material is dried and optionally sintered.

U.S. Pat. No. 4,786,618 describes a process for the production of $SiO_2/TiO_2$ glass of low coefficient of thermal expansion (ULE=ultra-low expansion) by means of an alkali metal silicate solution and colloidal $TiO_2$ having a pH of >9. The glass obtained is free from inhomogeneities and has a lower coefficient of expansion than silica glass. The glasses produced in this way comprise between 3 and 10 wt. % of $TiO_2$.

A disadvantage of the sol-gel process is that only low green densities can be obtained. High shrinkage rates consequently occur during drying and sintering. These process steps must be carried out very slowly, often over days and weeks, in order to avoid cracking.

It is furthermore known to use gas phase deposition processes, such as, for example, the so-called CVD process (CVD=chemical vapour deposition) for the production of $SiO_2/TiO_2$ glasses. The temperatures in these processes are between 200 and 2,000° C. The production of a clear glass with up to 16 wt. % $TiO_2$ is possible by this method.

U.S. Pat. Nos. 2,305,659 and 5,970,751 disclose combustion of precursors of silicon and titanium together in a flame to form particles which are in general called glass black or soot. The soot particles are deposited on a carrier and the porous body obtained in this way is then converted at high temperatures of about 1,500° C. to an opaline glass body, which in turn sinters at even higher temperatures to give a transparent glass body. The glass bodies (boules), which are as a rule very large, are further worked up, for example by cutting, into smaller pieces, such as, for example, for the production of lenses. They can also be combined to give larger optical bodies.

A disadvantage of the soot process is that three-dimensional shaped glass articles cannot be obtained directly from the process with an acceptable economic outlay. To obtain glass with various shapes, mechanical working is necessary (W. T. Minehan, G. L. Messing and C. G. Pantano, Titania-silica glasses prepared by sintering alkoxide derived spherical colloids. J. Non-Cryst. Solids 108 (1989) 163–168).

Because of the relatively low rate of deposition, the yield in the processes of deposition from the gas phase is rather low.

A composition of the $SiO_2/TiO_2$ soot particles is given, for example, in U.S. Pat. No. 5,180,411. According to this patent, three different forms are assumed to be present. On the one hand agglomerates of mixed oxide particles of $SiO_2$ and $TiO_2$ with a particle diameter of approximately 0.1 to 0.3 $\mu$m are present. In addition there are fine anatase $TiO_2$ particles on the surface of the $SiO_2/TiO_2$ agglomerates. Finally, larger anatase crystals with a diameter of between 0.2 and 1 $\mu$m are present in the soot. It is difficult and requires high process technology control to produce a uniform glass body from this non-uniform powder, which additionally can also be obtained in a varying composition.

Since in gas phase deposition by means of the soot process large amounts of $SiO_2/TiO_2$ soot which has not been deposited are obtained as a waste product, attempts have been made to employ this waste product elsewhere. WO 00/48775 describes a process for the production of honeycomb structures of glass by extrusion of $SiO_2/TiO_2$ soot. In this, the soot is processed in the presence of organic additives to give a paste, which is first extruded to a green body, then freed from the organic constituents by heating and finally sintered. A disadvantage of this process is the use of organic binders, which must be removed by combustion. Furthermore, shaped $SiO_2/TiO_2$ glass articles of optical quality cannot be produced.

SUMMARY OF THE INVENTION

An object of the invention is a process for the production of $SiO_2/TiO_2$ glasses with a low coefficient of expansion which does not have the disadvantages of the prior art. In particular, in contrast to the sol-gel processes described, the inventive process results in only a low shrinkage during drying and sintering and avoids long reaction times. In contrast to the gas deposition processes, it is thus possible to obtain three-dimensional shaped articles of optical quality directly from the process, without working up.

DETAILED DESCRIPTION OF THE INVENTION AND PREFERRED EMBODIMENTS THEREOF

The invention is of an aqueous dispersion comprising silicon/titanium mixed oxide powder with a BET surface area of 5 to 500 m²/g which has been prepared by flame hydrolysis and has a titanium dioxide content of 0.5 to 20 wt. %, based on the powder, water and at least one pH-regulating substance which can be removed completely from the reaction mixture upon heating, and the aqueous dispersion has a solids content of between 40 and 80 wt. %.

Flame hydrolysis means the hydrolysis of compounds of silicon and titanium in the gas phase in a flame produced by the reaction of hydrogen and oxygen. Highly disperse, non-porous primary particles are initially formed thereby, and during the further course of the reaction can grow together to form aggregates, which can further grow together to form agglomerates. Substantially spherical particles can also be obtained in the synthesis, depending on the choice of reaction conditions.

Mixed oxide means intimate mixing of titanium dioxide and silicon dioxide at the atomic level to form Si—O—Ti bonds. In addition, the primary particles can also have regions of silicon dioxide, in addition to titanium dioxide. Physical mixtures of silicon dioxide and titanium dioxide powders, the use of which is not suitable for the preparation of the aqueous dispersion according to the present invention, are to be distinguished from the mixed oxide powders employed according to the present invention. A distinction is also to be made between sols and gels, which can also contain Si—O—Ti bonds but are not suitable for the formation of the aqueous dispersion according to the invention due to their porous structure and the low degrees of fill as a result of their preparation.

In contrast to the known $SiO_2/TiO_2$ soot particles as described in U.S. Pat. No. 5,180,411, which consist of agglomerates of mixed oxide particles of $SiO_2$ and $TiO_2$, such particles with fine growths of anatase $TiO_2$ particles, larger anatase crystals, the silicon/titanium mixed oxide powders used for the dispersion according to the invention are uniform particles with Si—O—Ti bonds which can have regions of silicon dioxide and titanium dioxide only within the primary particles.

The silicon/titanium mixed oxide powder can furthermore contain traces of impurities from the starting substances, and also impurities caused by the process. These impurities can be up to 0.5 wt. %, but preferrably not more than 100 ppm.

The silicon/titanium mixed oxide powder which can be used according to the invention can be prepared, for example, by the method described in DE-A-42 35 996, by mixing silicon tetrachloride and titanium tetrachloride and burning them together with a hydrogen/air mixture.

Mixed oxide particles such as are described in German Patent Application 101 63 938.4-41 of Dec. 22, 2001 can also be employed according to the invention. They are obtained by passing two streams separately into a burner and there burning them, thereafter cooling the solid mixed oxide powder and the hot gases and separating the gases off from the solid. In this process the first stream comprises a vaporized titanium dioxide precursor, preferably titanium tetrachloride, hydrogen and oxygen or an oxygen-containing gas. The second stream comprises a vaporized silicon dioxide precursor, preferably silicon tetrachloride, oxygen or an oxygen-containing gas and/or an inert gas. The stream which comprises the silicon dioxide precursor can be introduced at one or more points in the reaction space.

A silicon/titanium mixed oxide powder can also be prepared by the method described in DE-A-196 50 500. In this process, an aerosol which is obtained by atomization and comprises a solution or suspension of a salt of a titanium compound is fed into a gas mixture comprising a silicon tetrahalide, hydrogen and air and mixed homogeneously therewith, and the aerosol/gas mixture is then reacted in a flame within a combustion chamber.

The silicon/titanium mixed oxide powders which the aqueous dispersion according to the invention can contain also include a pyrogenically prepared titanium dioxide enclosed by silicon dioxide, such as is described in European Patent Application 01 119 108.7 of Aug. 8, 2001.

This silicon/titanium mixed oxide powder is obtained by adding, while stirring, a $TiO_2$ dispersion and, for example, tetraethoxysilane and water to a base dissolved in water and separating off, optionally washing and drying the reaction product.

The BET surface area of the silicon/titanium mixed oxide powder is between 5 and 500 $m^2/g$. Powders with BET surface areas of between 20 and 300 $m^2/g$ are particularly advantageous for the aqueous dispersion according to the invention.

The titanium dioxide content of the silicon/titanium mixed oxide powder is 0.5 to 20 wt. %. In a preferred embodiment the titanium dioxide content of the silicon/titanium mixed oxide powder is 2 to 12 wt %, and in a particularly preferred embodiment 6 to 8 wt. %.

In addition to the silicon/titanium mixed oxide powder, the aqueous dispersion according to the invention comprises water and at least one pH-regulating substance which can be removed completely from the reaction mixture on heating. The dispersion according to the invention contains water as the main constituent of the liquid phase. No organic compounds which take over the function, for example, of a binder are present in the dispersion according to the invention. Only the pH-regulating substances can be of an organic nature. The pH of the dispersions according to the invention can be either in the acid pH range (pH 1 to 5) or in the basic pH range (pH 8.5 to 14). pH-regulating compounds which can advantageously be used are ammonium compounds, such as ammonia, ammonium fluoride, tetraalkylammonium hydroxides, or hydrochloric acid, acetic acid, formic acid, formates, acetates. These or their reaction products in the dispersion, because of their volatility, can easily be removed by heating during tempering or sintering of the glass which can be produced from the aqueous dispersion according to the invention. Only minimal amounts of these compounds may be necessary in the aqueous dispersion to adjust the pH.

The solids content of the silicon/titanium mixed oxide powder in the aqueous dispersion is between 40 and 80 wt. %. The high degree of fill contributes towards the production of crack-free green bodies with a low drying shrinkage. The aqueous dispersion according to the invention can also still be poured with high degrees of fill.

In a particular embodiment the aqueous dispersion according to the invention can comprise a silicon/titanium mixed oxide powder with a high BET surface area and one with a low BET surface area, the surface area of the silicon/titanium mixed oxide powder of high BET surface area being at least twice that of the surface area of the silicon/titanium mixed oxide powder of low BET surface area, and the weight ratio of the silicon/titanium mixed oxide powders of low to high BET surface area being between 60:40 and 99.5:0.5. Aqueous dispersions of this composition of the silicon/titanium mixed oxide powder are particularly suitable for the production of shaped glass articles of very low coefficient of expansion.

The invention also is of a process for the preparation of the aqueous dispersion according to the invention, in that the silicon/titanium mixed oxide powder is dispersed, by means of a dispersing device, in a medium of water and at least one pH-regulating substance which can be removed completely from the reaction mixture on heating. Dissolvers, toothed discs, rotor-stator machines, bead mills, stirred bead mills, planetary kneaders, planetary mixers, high pressure homogenizers or a combination of these devices can be employed as the dispersing device.

The invention also is of a green body which is produced using the aqueous dispersion according to the invention and in which the relative green density is between 40 and 85%, preferably at least 50%, particularly preferably between 60 and 80%. The green body according to the invention is free from cracks and has high strength.

The invention also is of a process for the production of the green body, wherein the aqueous dispersion according to the invention is poured into a mold, preferably of hydrophobic material, and dried at temperatures of between 20 and 40° C., optionally after-dried at 60 to 120° C. after removal from the mold and optionally then calcined at temperatures of about 800° C. (750 to 850° C.). After this process the linear drying shrinkage of the green body is preferably not more than 10%.

After drying or after-drying, the green body can be treated at about 800° C. (750 to 850° C.) in an atmosphere which comprises chlorine or fluorine and oxygen.

The invention also is of a shaped glass article of optical quality with a coefficient of thermal expansion of not more than $0.5 \times 10^{-6}$/K of pyrogenically prepared silicon/titanium mixed oxide powder with a BET surface area of 5 to 500 $m^2$/g and a titanium dioxide content of 0.5 to 20, preferably 2 to 12, particularly preferably 6 to 8 wt. %, based on the powder.

Optical quality is to be understood as meaning that the sintered shaped glass articles have the following features:
- no bubbling
- no detectable porosity
- density and refractive index correspond to the theoretical values
- amorphous in X-rays
- No crystalline $TiO_2$ components can be detected by means of Raman spectroscopy.
- The linear thermal expansion (CTE) of the shaped glass articles is less than $0.5*10^{-6}$/K in the range from 20° C. to 900° C.
- The transmission of the shaped glass articles, measured at 1,000 nm, is more than 99%. The transmission of a pane ten millimetres thick is measured here and corrected by the reflection losses on the front and rear.

The invention also is of a process for the production of a shaped glass article, wherein the green body is sintered at temperatures of between 1,050 and 1,600° C., preferably between 1,100 and 1,300° C., in a gas atmosphere or in a vacuum.

The gas atmosphere can be the gases helium, nitrogen, argon, carbon dioxide, mixtures of these gases with one another and/or with oxygen, or a reducing gas atmosphere. The gas atmosphere can furthermore comprise small amounts of water vapour.

In a preferred embodiment, the sintering can be carried out in a helium/oxygen gas atmosphere, it being possible for the oxygen content to be between 0.1 and 70, preferably between 1 and 20, particularly preferably between 2 and 5 vol. % oxygen.

The process can furthermore also comprise a further process step, in which, after sintering, the shaped glass article is melted completely or only on the surface.

The invention also is directed to the use of the shaped glass article according to the invention in the field of optical apparatuses, such as, for example, mirrors and lenses, as a component for apparatuses for the extreme UV range, for example as a mirror support, for preforming for the preparation of light-wave conductors.

The following examples illustrate the invention but are not to be considered as limiting thereof.

EXAMPLES

Example 1

Aqueous Dispersion: A high-speed dissolver (maximum about 10,000 rpm) with a total capacity of about 500 ml and a four-component stirrer (four blades each displaced by 90° C.) at the bottom is filled with 53 ml of doubly distilled water. 1.2 g of a 25 wt. % aqueous TMAH (tetramethylammonium hydroxide) solution are added. Thereafter, 46 g of pyrogenically prepared $SiO_2/TiO_2$ mixed oxide powder with an $SiO_2/TiO_2$ ratio of 93:7 and a BET surface area of 40 $m^2$/g, prepared in accordance with DE-A-42 35 996, are stirred in. After stirring, the pH of the dispersion is about 9. A further 4.8 g of the TMAH solution are added and 1.15 g methyl formate are subsequently added. The aqueous dispersion can optionally be sieved (40 µm mesh width). The dispersion has a degree of fill of approx. 42 wt. %.

Green body: The above prepared aqueous dispersion is either poured into an open mould of plastic or latex, or enclosed under a slightly increased pressure in a closed film of plastic of any desired geometry, for example a tubular film, which is impermeable to water. After heating to about 40° C. in a heating cabinet, solidification of the aqueous dispersion starts after about 4 minutes, and after about 2 hours the specimens are solid.

The open molds are dried in air for about one day at room temperature. Alternatively, the drying time can be shortened in a circulating air drying cabinet.

The closed molds are kept at room temperature for about one day and then opened and subsequently dried in air as described above.

An after-drying is carried out at 75° C. and 120° C. in a circulating air drying cabinet for in each case one day. The times can be shortened by optimizing the atmospheric humidity or temperature profile or also e.g. by the use of microwave heating. After drying the water content of the specimens which can be removed at 160° C. is <0.1 %.

The specimen is then calcined at 800° C. for about four hours. A silica glass tube is used for this which is provided with gas connectors on both sides and has been introduced into an electrically heated muffle furnace.

Purification of the specimen can be carried out with the same device which was used for the calcining. It is carried out in a gas stream of 50 ml/min of hydrogen chloride gas of semiconductor quality at ambient pressure. The temperature in the vicinity of the specimen is about 950° C. The duration of the process depends on the specimen size. In the case of a specimen of 10 cm diameter, the process takes about 4 hours.

Shaped glass article: The green body is subsequently sintered. Three sintering processes are used for this purpose:

A) Sintering in a vacuum oven type 1100 with tungsten resistance heating elements, Thermal Technologie, Bayreuth: pressure<$1*10^{-4}$ mbar, sintering temperature 1,350° C., holding time 30 min. The specimens showed a slight blue coloration after sintering due to reduction of the $TiO_2$ to $Ti^{3+}$. The blue coloration can be avoided by varying the temperature profile (e.g. 1,260° C., 300 min holding time).

B) Sintering under pure helium (technical-grade, 500 ml/min) in a vertical zoned sintering oven at
 (1) 1,350° C. and an advance of approx. 10 mm/min or
 (2) 1,200° C., advance 1 mm/min.

The oven has a vertical silica glass working tube of 150 mm diameter, and the specimen is held in a silica glass beaker resting on an aluminium oxide rod. The aluminium oxide rod is pushed in the center of the silica glass tube vertically centrally through the hot zone of the zoned sintering oven. The zoned sintering oven has a temperature profile which is symmetrical over the height and has a maximum about in the middle of the oven. The specimens have less blue coloration in the case of B1 than in the case of vacuum sintering.

Specimens without any blue coloration are achieved by using the optimized temperature profile B2.

C) Zoned sintering as described under B), but with a helium/oxygen mixture. The oxygen content is 3 mol % with respect to the helium content. Variation of the temperature parameters as described under B1 and B2.

The sintered shaped glass articles have the following features and characteristics:

- no bubbling
- no detectable porosity
- density and refractive index correspond to the theoretical values
- amorphous in X-rays
- No crystalline $TiO_2$ components can be detected by means of Raman spectroscopy.
- The linear thermal expansion (CTE) of the shaped glass articles is less than $0.1*10^{-6}/K$ in the range from 20° C. to 900° C.
- The transmission of the shaped glass articles, measured at 1,000 nm, is more than 99%. The transmission of a pane ten millimetres thick is measured here and corrected by the reflection losses on the front and rear.

The shaped glass articles can be subjected to various after-treatments:

D) Contact-less melting of the specimen:

The specimens are melted by migration zone-wise on a glass lathe in a flame without contact. In no case can a reboil effect or bubbling be observed.

E) Hot isostatic pressing of the specimens:

The specimens are subjected to hot isostatic pressing under a maximum of 2,000 bar at a temperature of not more than 1,600° C. Argon, nitrogen, helium and oxygen (max. 1,200° C., 2,000 bar) are used as atmospheres.

F) Tempering of the specimens after D) or E):

The specimens are tempered to establish a homogeneous refractive index profile. This correlates with homogenization of the fictive temperature in the specimen.

During the after-treatment, the bluish coloration of the shaped glass articles, where this is present in individual specimens, disappears. No phase separation occurs. After the after-treatment steps the specimens continue to be amorphous in X-rays. Specimens which have passed through F) show the following properties:

(Q1) Inclusion class 0 to 5. The inclusion classes are taken from Corning Code 7940 Quartz Glass, Corning.

(Q2) Refractive index homogeneity<$0.5*10^{-6}$ at a specimen diameter of 100 mm and a specimen thickness of 100 mm.

Further embodiments of examples 2–8 differ from example 1 in the composition and preparation of the aqueous dispersion. The following Table shows the composition of the aqueous dispersions of examples 1 to 8. The quality of the shaped glass articles in examples 1 to 6 corresponds to that of example 1. Example 7 shows a slightly higher coefficient of expansion with $0.2*10^{-6}/K$ in the range between 20° C. and 900° C.

Comparative example 8 is not based on a silicon/titanium mixed oxide powder, but on a physical mixture of $SiO_2$ powder and $TiO_2$ powder. The shaped glass article obtained is not transparent, regardless of the process used. It shows significant crystalline contents, which are detected by Raman spectroscopy and X-ray diffraction. Some specimens have a dirty bluish coloration.

Homogeneous transparent glasses cannot be produced even by after-treatment steps.

TABLE

Composition[1] of the dispersions

| | Powder | | pH regulator | |
|---|---|---|---|---|
| Ex. | BET $m^2/g$ | Solids content wt. % | 1 | 2 |
| 1 | 40 | 42 | TMAH | methyl formate |
| 2 | 40 | 65 | TMAH | methyl formate |
| 3 | 10 and 50 (mixture) | 70 | TMAH | methyl formate |
| 4 | 42 | 67 | $NH_4F$ | — |
| 5 | 42 | 51 | TMAH | HCl |
| 6 | 42 | 67 | HCl | — |
| 7 | 42 | 51 | $NH_4F$ | — |
| 8 (Comparative) | 50 (mixture) 50 | 44 | TMAH | methyl formate |

[1]Ex. 1–7: $SiO_2/TiO_2$ mixed oxide powder; $SiO_2/TiO_2$ ratio: ex. 1–6: 93:7; ex. 7: 97:3; ex. 8: physical mixture of $SiO_2$ powder and $TiO_2$ powder, $SiO_2/TiO_2$ ratio = 97:3

Example 2

A dispersion according to example 1 is prepared, but with 53 ml of doubly distilled water, a total of 6 g of the 25 wt. % aqueous TMAH solution, 105 g of pyrogenically prepared $SiO_2/TiO_2$ mixed oxide powder and 1.15 g methyl formate. The dispersion has a degree of fill of approx. 65 wt. %. A lower drying and sintering shrinkage is found as compared to example 1.

Example 3

A dispersion according to example 1 is prepared, but with 53 ml of doubly distilled water, a total of 6 g of the 25 wt. % aqueous TMAH solution, 128 g of pyrogenically prepared $SiO_2/TiO_2$ mixed oxide powder (BET=10 $m^2/g$), 6 g of pyrogenically prepared $SiO_2/TiO_2$ mixed oxide powder (BET=50 $m^2/g$), both powders having an $SiO_2/TiO_2$ ratio of 93:7, and 1.15 g methyl formate. The dispersion has a solids content of 70 wt. %. The green body has a high mechanical strength and a low drying shrinkage.

Example 4

300 ml of doubly distilled water, 2.4 g ammonium fluoride, 610 g $SiO_2/TiO_2$ mixed oxide powder (BET=42 $m^2/g$, $SiO_2/TiO_2$=93:7) are dispersed by means of a dissolver. The solids content of the aqueous dispersion is 67 wt. %.

The aqueous dispersion is stirred for two hours in a vacuum, during which air bubbles are removed to the largest extent. Thereafter, the dispersion is sieved with a sieve of 60 mm mesh width. The samples are introduced into open molds and closed molds as described in example 1. After 48 hours at room temperature the specimens are removed from the molds.

Example 5

210 g $SiO_2/TiO_2$ mixed oxide powder (BET=42 $m^2/g$, $SiO_2/TiO_2$=93:7) are dispersed in 300 ml of doubly distilled water by means of a dissolver. The solids content of the aqueous dispersion is 41 wt. %. After addition of 2 ml TMAH (25 percent solution), a further 100 g $SiO_2/TiO_2$ mixed oxide powder are added. The solids content of the aqueous dispersion is now 51 wt. %. Thereafter, 0.5 ml hydrochloric acid (30 wt. %) is added and the aqueous dispersion is poured into molds. The drying and sintering are carried out as described under example 1.

Example 6

300 ml of doubly distilled water and a total of 610 g $SiO_2/TiO_2$ mixed oxide powder (BET=42 m²/g, $SiO_2/TiO_2$=93:7) are dispersed by means of a dissolver. During this operation, after addition of in each case 100 g of mixed oxide powder the pH in each case is adjusted again to pH 2.0 by addition of concentrated hydrochloric acid. The solids content of the aqueous dispersion is 67 wt. % after dispersion of the total amount of powder.

The aqueous dispersion is stirred for two hours in a vacuum, during which time air bubbles are removed to the largest extent. Thereafter, the dispersion is sieved with a sieve of 60 mm mesh width. The samples are introduced into open molds as described in example 1. After 48 hours at room temperature the specimens are removed from the molds. Thereafter, the further procedure is according to example 1.

Example 7

As example 4, but with a pyrogenically prepared $SiO_2/TiO_2$ powder with an $SiO_2/TiO_2$ ratio of 97:3.

Example 8 (Comparative Example)

300 ml of doubly distilled water, 2.4 g ammonium fluoride, 220 g of pyrogenically prepared $SiO_2$ powder (BET=50 m²/g, OX 50, Degussa AG) and 17 g of pyrogenically prepared $TiO_2$ powder (BET=50 m²/g) are dispersed by means of a dissolver. An $SiO_2/TiO_2$ ratio of 97:3 is achieved in the aqueous dispersion in this way. The solids content of the aqueous dispersion is 44 wt. %.

The aqueous dispersion is stirred for two hours in a vacuum, during which time air bubbles are removed to the largest extent. Thereafter, the dispersion is sieved with a sieve of 60 mm mesh width. The samples are introduced into open molds and closed molds as described in example 1. After 48 hours at room temperature the specimens are removed from the molds. The further procedure corresponds to example 1.

This application is based on German Priority Application 102 08 371.1, filed Feb. 27, 2002, incorporated herein by reference in its entirety.

What is claimed is:

1. An aqueous dispersion comprising a silicon/titanium mixed oxide powder with a BET surface area of 5 to 500 m²/g which has been prepared by flame hydrolysis and has a titanium dioxide content of 0.5 to 20 wt. %, based on the powder, water and at least one pH-regulating substance which can be removed completely from the reaction mixture on heating, the dispersion having a solids content of between 40 and 80 wt. %.

2. An aqueous dispersion according to claim 1, wherein the silicon/titanium mixed oxide powder comprises a silicon/titanium mixed oxide powder with a high BET surface area and one with a low BET surface area, the surface area of the silicon/titanium mixed oxide powder of high BET surface area being at least twice that of the surface area of the silicon/titanium mixed oxide powder of low BET surface area, and the weight ratio of the silicon/titanium mixed oxide powders of low to high BET surface area being between 60:40 and 99.5:0.5.

3. A process for the preparation of the aqueous dispersion according to claim 2, comprising dispersing a silicon/titanium mixed oxide powder by means of a dispersing device, in a medium of water and at least one pH-regulating substance which can be removed completely from the reaction mixture on heating.

4. A green body prepared from an aqueous dispersion according to claim 2, wherein its relative green density is between 40 and 85%.

5. A process for the preparation of the green body according to claim 4, wherein the aqueous according to claim 2 is poured into a mold and dried at a temperature of between 20 and 40° C., optionally after-dried at 60 to 120° C. after removal from the mold and optionally then calcined at a temperature of about 750 to 850° C.

6. Process according to claim 5, wherein the mold is a hydrophobic material.

7. Process according to claim 5, wherein after drying or after-drying, the green body is treated at about 750 to 850° C. in an atmosphere which comprises chlorine, hydrogen chloride, fluorine and/or oxygen.

8. A process for the preparation of the aqueous dispersion according to claim 1, comprising dispersing a silicon/titanium mixed oxide powder by means of a dispersing device, in a medium of water and at least one pH-regulating substance which can be removed completely from the reaction mixture on heating.

9. A green body prepared from an aqueous dispersion according to claim 1, wherein its relative green density is between 40 and 85%.

10. A process for the preparation of the green body according to claim 9, wherein the aqueous dispersion according to claim 1 is poured into a mold and dried at a temperature of between 20 and 40° C., optionally after-dried at 60 to 120° C. after removal from the mold and optionally then calcined at temperatures of about 750 to 850° C.

11. Process according to claim 10, wherein the mold is a hydrophobic material.

12. Process according to claim 10, wherein after drying or after-drying, the green body is treated at about 750 to 850° C. in an atmosphere which comprises chlorine, hydrogen chloride, fluorine and/or oxygen.

13. A green body prepared from an aqueous dispersion according to claim 1, wherein its relative green density is at least 50%.

14. A green body prepared from an aqueous dispersion according to claim 1, wherein its relative green density is between 60 and 80%.

15. A shaped glass article of optical quality with a coefficient of thermal expansion of not more than $0.5 \times 10^{-6}$/K of pyrogenically prepared silicon/titanium mixed oxide powder with a BET surface area of 5 to 500 m²/g and a titanium dioxide content of 0.5 to 20 wt. %, based on the powder.

16. A process for the preparation of the shaped glass article according to claim 15, comprising sintering the green body according to claim 9 at a temperature of between about 1,050 and 1,600° C. in a gas atmosphere or in a vacuum.

17. A process according to claim 16, wherein after sintering, the shaped glass article is melted completely or only on the surface.

18. A process for the preparation of the shaped glass article according to claim 15, comprising sintering the green body according to claim 4, at a temperature of between about 1,050 and 1,600° C. in a gas atmosphere or in a vacuum.

19. A process according to claim 18, wherein after sintering the shaped glass article is melted completely or only on the surface.

20. A shaped glass article according to claim 15, as a component in an optical apparatus, as a component for apparatuses for the extreme UV range, or for the preparation of light-wave conductors.

21. A shaped glass article according to claim 20, in the shape of a mirror, lens or support for a mirror.

* * * * *